No. 645,311. Patented Mar. 13, 1900.
J. D. DILLER.
BLOWER FOR THRESHING MACHINES.
(Application filed May 26, 1899.)
(No Model.)
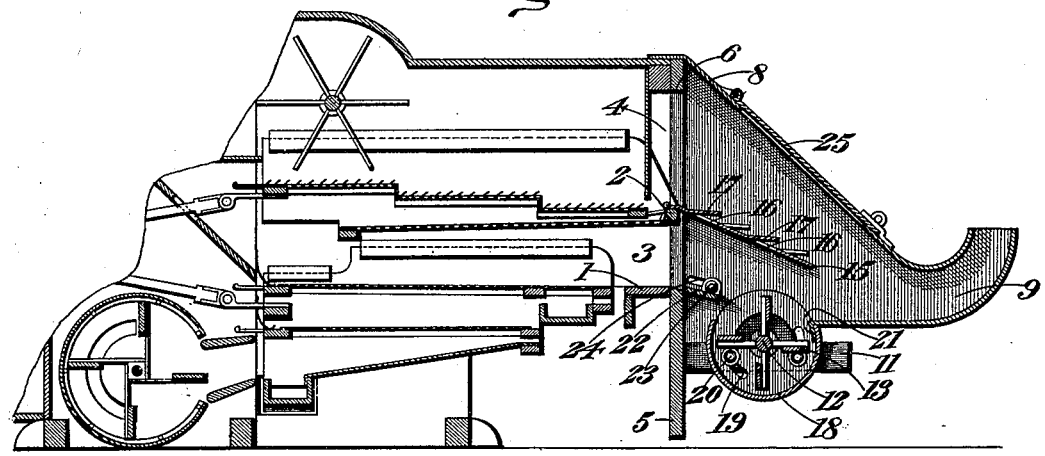
Fig. I.
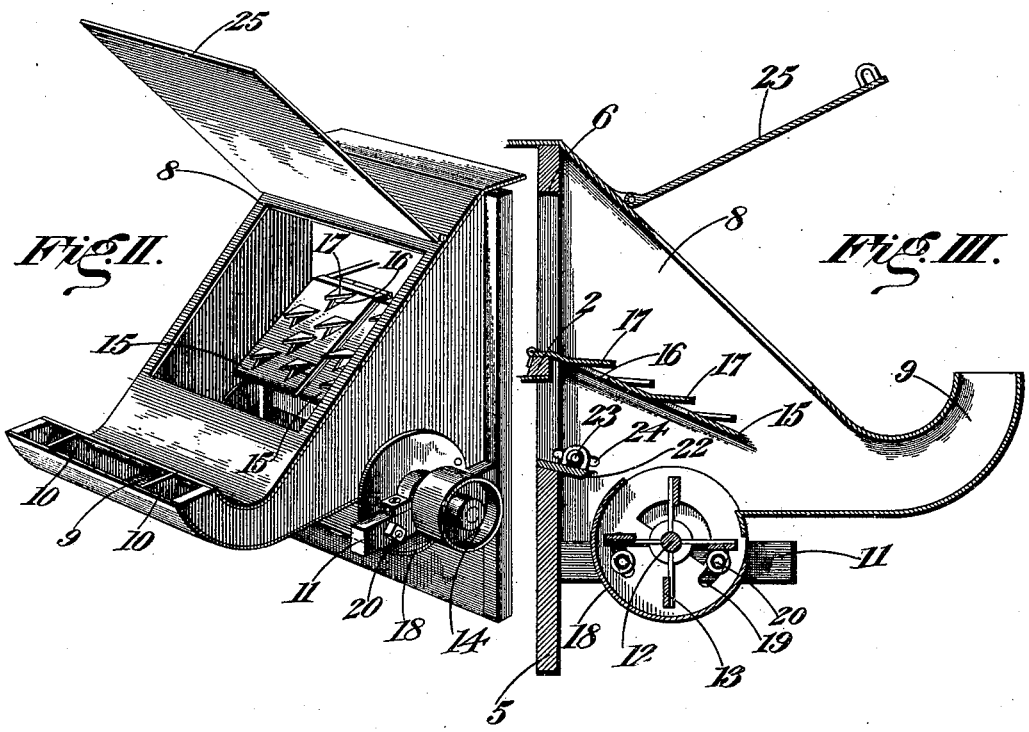
Fig. II.   Fig. III.
Witnesses
M. E. Fowler
Stephen A. Brooker
Inventor:
John D. Diller
By Jasper Atkins
Attorney

UNITED STATES PATENT OFFICE.

JOHN D. DILLER, OF PANDORA, OHIO.

BLOWER FOR THRESHING-MACHINES.

SPECIFICATION forming part of Letters Patent No. 645,311, dated March 13, 1900.

Application filed May 26, 1899. Serial No. 718,400. (No model.)

*To all whom it may concern:*

Be it known that I, JOHN D. DILLER, of Pandora, in the county of Putnam, State of Ohio, have invented certain new and useful Improvements in Blowers or Blowing-Machines for Threshing-Machines, Clover-Hullers, Huskers, Shredders, or the Like, of which the following is a complete specification, reference being had to the accompanying drawings.

The object of my invention is to produce improvements in blowers of the kind described, whereby they may be operated with comparatively-small expenditure of power, without breaking or crushing the straw, and without choking of the straw within the blower. Moreover, I provide my machine with means for readily regulating its mechanism, and thereby adapting it with facility to the work which it has to perform.

In the accompanying drawings, Figure I is a vertical section of my blower attached to or incorporated with a portion of a threshing-machine, also shown in vertical section. Fig. II is a perspective view of the exterior of my blower detached. Fig. III is a view of the blower detached, similar to Fig. I, showing the riddle-door open and the fan-drum adjusted to the open position.

Referring to the numerals on the drawings, 1 indicates the tail-board, and 2 the shaker-bar, between which is defined a chaff-chute 3, a straw-chute 4 being defined above the shaker-bar 2.

The above-described parts are specified in order to indicate the relations of my blower to a machine; but the remaining portions of the machine shown in Fig. I, being entirely non-essential and constituting not even a preferred form of the wide variety of machines to which my blower is applicable, do not require further description or detail illustration and are only exhibited incidentally in a partial and fragmentary manner.

Referring now to that portion which constitutes my invention, 5 indicates a frame-piece which may form a part of or be entirely independent of the machine to which a particular blower is applied. The frame-piece 5 is provided with an aperture 6 of sufficient dimensions to include both of the chutes 3 and 4, or so much thereof as it may be necessary to include, the chutes being separated by the shaker-bar 2, which preferably works between the side walls of the aperture 6. To the outer face of the frame 5 is secured a hood 8, having converging sides that preferably terminate in a throat 9, preferably constricted, as by inner converging walls 10. (See particularly Fig. II.)

Preferably below the plane of the tail-board 1, as upon bearing-supporting studs 11, is revolubly mounted a shaft 12, carrying blades and constituting a rotary fan 13. The shaft is provided upon one end with means for applying driving power to it—as, for example, a pulley 14. (See Fig. II.) Above the fan 13 and secured to the oscillatory bar 2 I provide a series of independently-movable plates 15, their degree of downward movement being limited to a slanting position, substantially as shown in Figs. I and III of the drawings. These plates are preferably provided with covered apertures 16. They may be made as by striking up from the metal of which the plates are preferably composed a series of triangular lips 17, which being retained in the plates constitute coverings, as specified, for the respective apertures 16. The plates 15 preferably terminate at their lower extremities beyond the periphery of rotation of the fan 13 and, communicating with the straw-chute 4, discharge the straw clear of the fan and in proximity to the throat 9 of the blower.

Through the movement of the plates 15 imparted by the movement of the bar 2, as well as through the currents of air forced through the apertures 16, the straw is caused to pass freely from the chute 4 over the plates 15 easily and without choking. The straw dropping clear of the fan 13 is not broken, but is passed in good condition through the throat 9. The fan 13 is aided by the drafts created in the threshing-machine proper, but also derives air-supply independent thereof. The fan is preferably partially surrounded by a shell 18, whose ends are provided with slots 19, by which, through the aid of screws or bolts 20, the position of the shell may be adjusted and fixed about the axis of the shaft 12. The rear end of the shell 18 coöperates with a depending flange or lap 21, to cover which the shell may be adjusted, as shown in Fig.

I, or from which it may be separated, as shown in Fig. III. By the means last specified the amount of air supplied to the fan and the manner of admitting the air thereto may be regulated to a nicety.

The elements above described, comprising the hood 8, fan 13, and plates 15, assembled substantially as described, constitute one completely-practicable form of embodiment of machine. I prefer, however, in addition thereto, to provide a tail-board extension 22, adjustable, as by bolts 23, working in slots 24 in the sides of the hood 8, whereby a free opening between the forward face of the shell and the outer side of the frame-piece 5 may be provided for the separation of screenings from the chaff or straw and the discharge thereof after separation. Through the adjustability, however, of the extension 22 and shell 18 the opening between the shell and the frame-piece 5 may be entirely closed, so that the screenings may be blown off through the throat 9, an operation which would be desirable, for instance, if the screenings were composed principally of cheat or other worthless material.

It was specified that the fan 13 is located preferably below the level of the plane of the tail-board 1; but it is obvious that its axis might be located in a plane above that of the shaker-bar 2, in which position the drafts created by it would draw upon the chute 3, upon the apertures 16, and more directly upon the straw-chute 4. I mention this as an obvious variation and also to indicate that the position of the riddle-door 25, which is shown in the drawings as forming a part of the upper wall of the hood 8, may be located in the lower part thereof. The riddle-door is designed to gain access to the interior of the machine, particularly the riddles, which require to be changed from time to time. It is preferably located in the upper part of the hood, as illustrated, because in that position it can be opened without interrupting the operation of the machine, but would have to be kept closed at such time if located in the lower part of the hood 8.

What I claim is—

1. In an apparatus adapted to be connected with a grain-separating machine, the combination with a frame comprising a hood, of a fan, an oscillatory bar, and independently-movable plates, projecting in a slanting direction above and beyond the fan, substantially as set forth.

2. An apparatus comprising the combination with a hooded frame, an oscillatory bar and plate, of a fan carried on the frame, a shell about the fan, and a tail-board extension in proximity to the shell, substantially as set forth.

3. An apparatus comprising the combination with a hooded frame and a plate, of a fan carried on the frame, a shell about the fan, and an adjustable tail-board extension, substantially as set forth.

4. An apparatus comprising the combination with a hooded frame, oscillatory bar, and plate, of a fan carried on the frame, and a shell adjustable about the fan, independently of the frame, substantially as set forth.

5. An apparatus comprising the combination with a hooded frame, oscillatory bar, and plate, of a fan carried on the frame, an adjustable shell about the fan, and an adjustable tail-board extension, substantially as set forth.

In testimony of all which I have hereunto subscribed my name.

JOHN D. DILLER.

Witnesses:
J. FRANK FURMAN,
E. R. EASTMAN.